United States Patent
Beltz

[11] Patent Number: 4,988,862
[45] Date of Patent: Jan. 29, 1991

[54] OPTICAL OCCUPANT RESTRAINT ACTIVATION SENSOR

[75] Inventor: Dale L. Beltz, Northville, Mich.

[73] Assignee: Ford Motor Company, Dearborn, Mich.

[21] Appl. No.: 413,362

[22] Filed: Sep. 27, 1989

[51] Int. Cl.⁵ .......................... G01D 5/34; B60R 21/32
[52] U.S. Cl. ........................... 250/227.15; 250/231.1; 280/735
[58] Field of Search .................. 250/227.15, 227.14, 250/221, 231.10, 231.19; 280/735, 734; 73/800; 356/73.1

[56] References Cited

U.S. PATENT DOCUMENTS

| | | | |
|---|---|---|---|
| 3,596,269 | 7/1971 | Laska | 340/421 |
| 4,269,506 | 5/1981 | Johnson et al. | 73/800 |
| 4,284,863 | 8/1981 | Breed | 200/61.53 |
| 4,329,549 | 5/1982 | Breed | 200/61.45 M |
| 4,346,914 | 8/1982 | Livers et al. | 280/735 |
| 4,367,460 | 1/1983 | Hodara | 250/227.15 |
| 4,420,251 | 12/1983 | James et al. | 356/32 |
| 4,477,732 | 10/1984 | Mausner | 280/734 |
| 4,577,100 | 3/1986 | Meltz et al. | 250/231.19 |
| 4,603,252 | 7/1986 | Malek et al. | 250/227 |
| 4,638,179 | 1/1987 | Mattes et al. | 280/735 |
| 4,639,713 | 1/1987 | Kitagawa et al. | 250/227.15 |
| 4,734,577 | 3/1988 | Szuchy | 250/227 |
| 4,737,626 | 4/1988 | Hasegawa | 250/221 |
| 4,740,741 | 4/1988 | Andres et al. | 280/735 |
| 4,772,092 | 9/1988 | Hofer et al. | 350/96.24 |
| 4,816,627 | 3/1989 | Janotik | 200/61.45 M |

Primary Examiner—David C. Nelms
Assistant Examiner—Michael Messinger
Attorney, Agent, or Firm—Daniel M. Stock; Roger L. May

[57] ABSTRACT

An occupant restraint activation sensor includes a light source and a photo responsive detector in optical communication through a light pipe. The severing of this communication by fracturing of the light pipe being indicative of the occurrence of a predetermined impact load on the vehicle because of the mounting of the light pipe on a vehicle structural member whose deflection indicates the occurrence of such a load.

10 Claims, 2 Drawing Sheets

OPTICAL OCCUPANT RESTRAINT ACTIVATION SENSOR

BACKGROUND OF THE INVENTION

The present invention relates generally to occupant restraint activation sensors, and more specifically to an improved sensor employing optical techniques for sensing the occurrence of a collision in an automotive vehicle, particularly a frontal collision.

Modern automotive vehicles employ passive occupant restraint systems for cushioning or restraining occupant movement when a vehicle is involved in a collision. One type of such restraint system is an inflatable occupant restraint airbag system in which gas is generated to inflate a bag in response to the conditions representative of the occurrence of a collision. In automotive vehicles which utilize airbag systems, the type of collision for which an airbag is deployed is typically a frontal collision. Its occurrence is sensed by a plurality of sensors positioned within the vehicle which detect a deceleration of a predetermined magnitude and duration and thereupon transmit a signal effecting inflation of the airbag. Exemplary of such sensors are those disclosed in U.S. Pat. No. 4,816,627 to Janotik assigned to the assignee of the present invention and U.S. Pat. No. 4,329,549 and U.S. Pat. No. 4,284,863 to Breed. In vehicle occupant restraint systems employing such electromechanical sensors, a sensing mass is positioned for movement generally parallel to the direction of travel of the vehicle. Due to the likelihood of occurrence of angular frontal impacts, which will result in a difference in deceleration levels sensed at positions laterally spaced across the front of the vehicle, it is necessary to provide a plurality of sensors placed in spaced positions to assure the proper sensing of deceleration load indicative of a vehicle collision of sufficient severity to warrant the activation of the airbag system.

An additional quantity of sensors is also used in such systems as a check against inadvertent actuation that might occur in response to short duration, high magnitude deceleration not indicative of a collision.

While this prior art approach to sensing the occurrence of collisions in activating airbag systems has been found to be functionally acceptable, the approach suffers from certain disadvantages. One is the relatively high cost of manufacture attendant the provision of a plurality of discreet sensors for the production of an airbag restraint system, and another is that the prior art systems employing electromechanical acceleration sensors monitor an inherently ambiguous phenomenon, acceleration.

SUMMARY OF THE INVENTION

Responsive to the disadvantages of the occupant restraint activation systems of the prior art, it is an object of the present invention to provide a single sensor operative to detect the imposition of a predetermined impact load on the vehicle and to communicate the occurrence of that impact load to activate the vehicle occupant restraint system.

It is a further object of the present invention to provide such a sensor which directly senses the imposition of the predetermined impact load on the vehicle independent of the occurrence of any particular magnitude and duration of acceleration.

According to a feature of the present invention, a sensor is provided which includes a light source mounted on the vehicle and a light transmission module extending laterally across the front of the vehicle in communication with a photo response detector, the light transmission module being supported on a structural body member of the vehicle, the substantial deflection of which is indicative of the occurrence of the imposition of the predetermined impact load.

According to another feature of the present invention, the sensor includes a signal transmission device operative to activate the vehicle occupant restraint when the optical communication between the light source and the photo responsive detector is broken in the deflection of the structural body member.

BRIEF DESCRIPTION OF THE DRAWINGS

These and other objects and features of the invention will become apparent to those skilled in the automotive occupant restraint arts upon reading the following description with reference to the accompanying drawings in which.

DESCRIPTION OF THE PREFERRED EMBODIMENT

Figure 1:
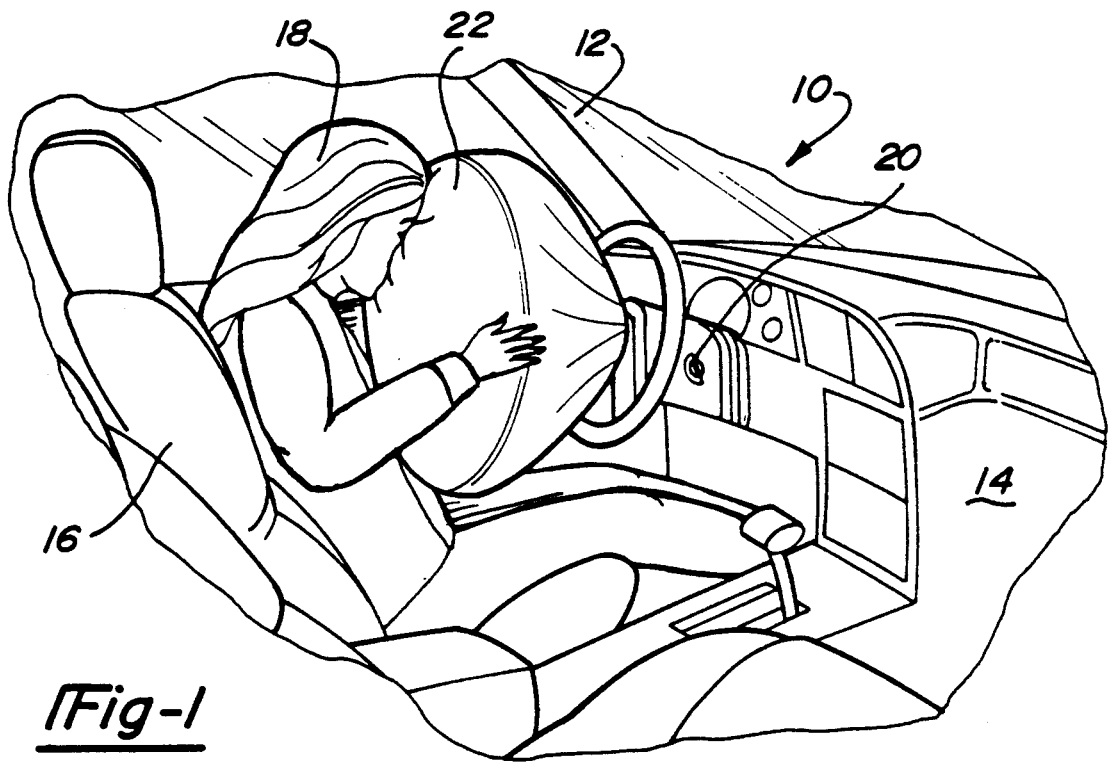
FIG. 1 is a perspective view of the interior of an automotive vehicle in which a driver restraint airbag is deployed.

Turning now to the drawing, and particularly to FIG. 1 thereof, an automotive vehicle indicated generally at 10 includes a body portion which is designated by the numeral 12 and a passenger compartment 14 including a seat 16 for support of an occupant 18 rearwardly of a steering wheel 20. Vehicle 10 is illustrated as including a supplemental airbag 22 mounted on a steering wheel 20 and illustrated in its inflated state in which it cushions the occupant 18 against forward movement upon the occurrence of a frontal collision with the vehicle. While the specific design of the body 12 of the vehicle 10 is not critical to the design or operation of the occupant restraint activation sensor of the present invention, it should be understood that all vehicle bodies include some frontally positioned structural member, such as the radiator support structure 24 generically depicted in FIG. 2. Such frontal structural members, according to the present invention, may be chosen from any laterally extending structural member whose substantial deflection is indicative of the occurrence of a vehicle frontal collision.

Figure 2:
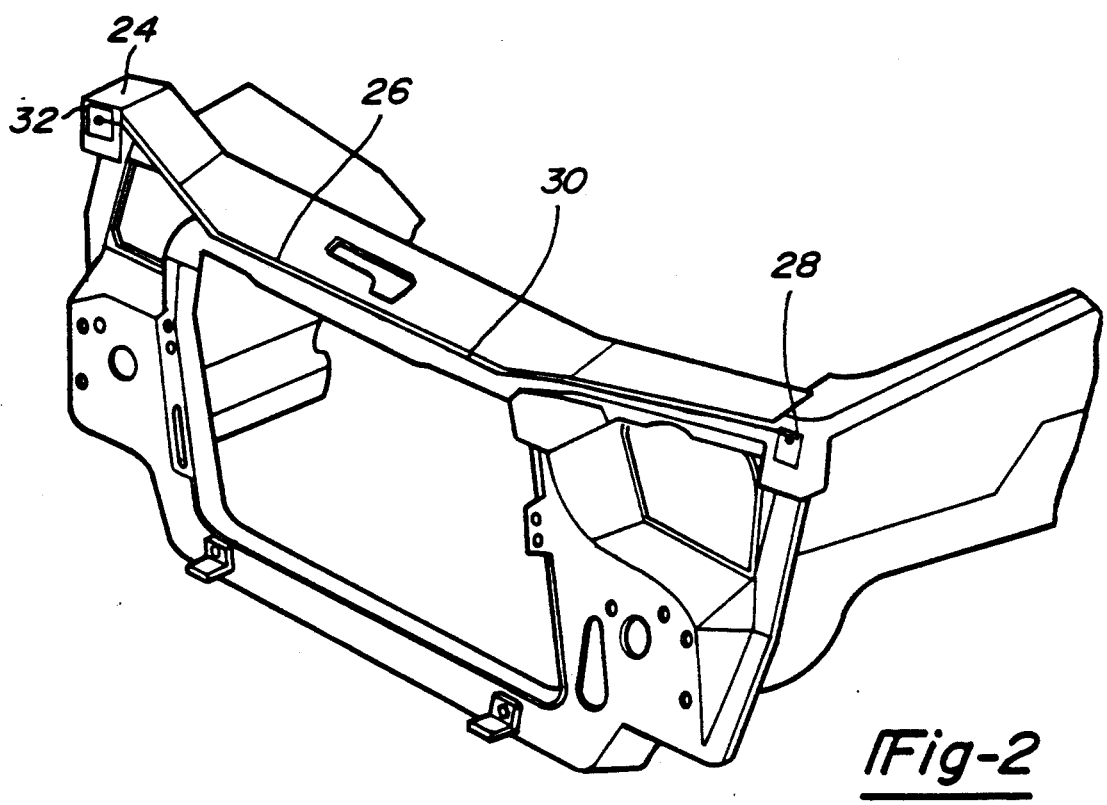
FIG. 2 is a perspective view of a frontally placed structural member of an automotive vehicle with the sensor of the present invention installed thereon.
Figure 3:
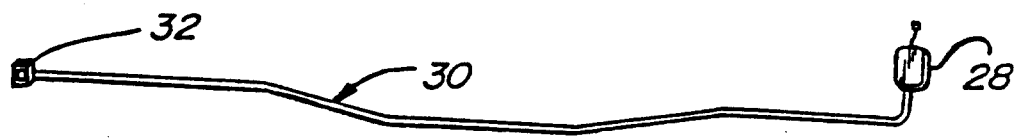
FIG. 3 is a front elevational view of the sensor depicted in FIG. 2.

Turning then to FIG. 2, an occupant restraint activation sensor, indicated generally at 26, is illustrated as being fixed to extend laterally across the radiator support structure 24. The sensor 26 generally includes, as may best be seen in FIG. 3, a light source and activation module 28, a light transmission module 30, and a signal return module 32.

Figure 4:
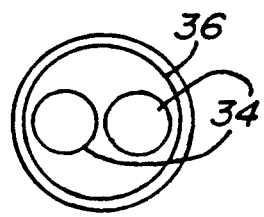
FIG. 4 is a cross-sectional view of a one preferred embodiment of the light transmission module of the sensor of the present invention.

More specifically, the light transmission module 30 is illustrated as comprising an optical fiber conduit or light pipe 34 of the type generally known in the art to comprise a transparent core of suitable glass or plastic material carried within a relatively thin cylindrical coating, having an index of a refraction less than the refractive index of the core. The fiber core functions as a wave guide to transmit and propagate the light along the core with little loss in light intensity. The light pipe 34 is supported in an opaque carrier 36, which is fixedly secured to the radiator support structure 24. As can best be seen in FIG. 8, one end of the light transmission module 30 is in optical communication with a light source 38 of light transmission and activation module 28. The other end of the light transmission module 30 is fixedly secured to the signal return module 32. In one preferred embodiment of the sensor of the present invention, the light pipe 34 is formed to have circular cross-section, as indicated in FIG. 4, and is carried in a support structure of circular cross-section, as indicated at 36. An alternative construction is shown in FIG. 5, in which the light pipe 34' is formed to have rectilinear cross-section and the support structure 36' similarly may have the rectilinear cross-section.

Figure 5:
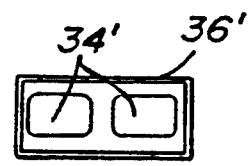
FIG. 5 is a cross-sectional view of an alternative embodiment of a light transmission module of the present invention.
Figure 6:
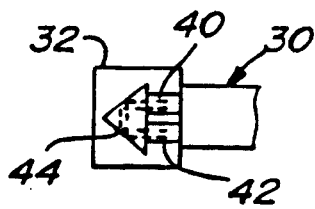
FIG. 6 is a diagrammatic cross-sectional view of a preferred embodiment of a reversing means positioned at one end of the sensor of the present invention.
Figure 7:
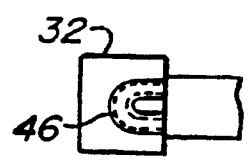
FIG. 7 is a diagrammatical cross-sectional view of an alternative embodiment of the reversing means of FIG. 6.

In both the alternative embodiments of FIGS. 4 and 5, the light pipes 34 and 34' are illustrated as comprising two separated pipe cross sections, one for transmitting the light from the light source 38 laterally across the front of the vehicle 10, and the other for returning that light. The return is effected through agency of the signal return module 32 fixedly secured to the side of the radiator support structure 24 opposite that on which the light transmission and activation module 28 is situated. In one preferred embodiment of the signal return module 32 illustrated in FIG. 6, the light pipe core 34 is illustrated as comprising a pair of separate core members 40, 42, which are in optical communication with a prism reflector shown schematically at 44 carried within the signal return module 32. In an alternative embodiment, the light pipe 34 is constructed as a continuous pipe having a U-shaped return portion 46 carried within the signal return module 32, as is illustrated in FIG. 7.

Figure 8:
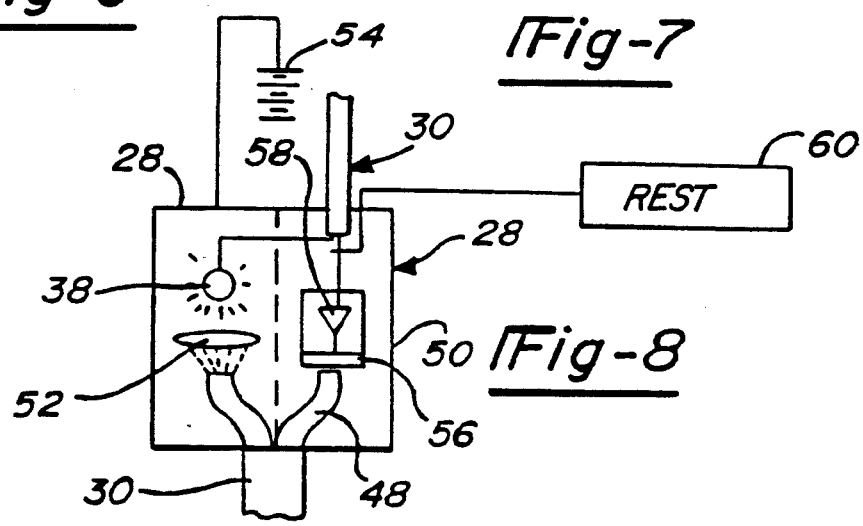
FIG. 8 is a diagrammatical cross-sectional view of a light source and signal transmission module positioned at the other end of the light transmission module of the sensor of the present invention.

At the return end designated as 48 in FIG. 8 of the light transmission module 30, a photo sensitive device indicated schematically as a crash discrimination and activation module 50 is positioned within the module 28. The module 28 accordingly houses light source 38, the crash discrimination and activation module 50, and a focusing lens 52. The light source is connected in known manner to a source of vehicle electrical power, such as that indicated diagrammatically at 54, and during normal vehicle operation, light from the source 38 is focused through the lens 52 into the core 34 or 34' of the light transmission module 30. The light passes from there laterally across the vehicle to the signal return module 32 and back to the crash discrimination and activation module 50. The sensor is a photo responsive detector of known design indicated at 56 which passes an electrical signal to an electronic device, such as the diode indicated at 58 indicative of a normal or "no collision" condition. Upon the occurrence of a collision of sufficient magnitude to deflect the radiator support structure 24 such that the light pipe 34 or 34' is fractured, optical communication between the light source 38 and the photo responsive detector 56 is severed, changing the signal to the electronic device 58 to indicate the occurrence of a collision. It will be understood that the size and strength of the light transmission module 30 and the design and arrangement of the attachment to the radiator support 24 must be chosen to insure fracture under appropriate deflection. The changing condition of electronic device 58 is then utilized to activate the occupant restraint system indicated generally at 60 to which the crash discrimination and activation module 50 is electrically connected. This results in inflation of the air bag 22 as shown in FIG. 1.

It will be clear to those skilled in the art that while only one exemplary embodiment of the occupant restraint activation sensor of the present invention has been described, others will be possible without departing from the scope of the appended claims. One such embodiment whose illustration is deemed unnecessary is one in which the signal return module is eliminated and the light source 38 and crash discrimination and activation module 50 are positioned on opposite sides of the vehicle.

I claim:

1. An occupant restraint activation sensor for an automotive vehicle having a body, the sensor comprising:
    a light source carried on said vehicle;
    a light transmission module extending laterally across a frontal area of said vehicle in optical communication with said light source; and
    a photo responsive detector in optical communication with said light transmission module, said light transmission module being supported on structural body members of said vehicle, the substantial deflection thereof being indicative of the occurrence of the imposition of a predetermined impact load on the vehicle body and being operative in response to said load imposition to fracture said light transmission module, thereby severing optical communication between said light source and said photo responsive detector.

2. An occupant restraint activation module as defined in claim 1, and further comprising:
    signal transmission means operative to activate the vehicle occupant restraint only when optical communication between said source and said photo responsive detector is severed.

3. A occupant restraint activation sensor as defined in claim 1, wherein said light source and said photo responsive detector are positioned together on one side of said vehicle body, and wherein said signal return module is positioned on the other side of said vehicle body, said signal return module including reversing means operative to reverse optical communication laterally across said vehicle body.

4. An occupant restraint activation sensor as defined in claim 3, wherein said light transmission module comprises a pair of light pipes, and said signal return module includes a prism reflector positioned between said light pipes to effect optical communication therebetween.

5. An occupant restraint activation sensor as defined in claim 3, wherein said light transmission module comprises a continuous light pipe formed to extend laterally across said vehicle body to said signal return module and return therefrom, and wherein said signal return module includes means for supporting said light pipe.

6. An occupant restraint activation sensor as defined in claim 4, wherein said light pipes are of round cross-section.

7. An occupant restraint activation sensor as defined in claim 5, wherein said light pipes are of round cross-section.

8. An occupant restraint activation sensor as defined in claim 4, wherein said light pipes are of rectilinear cross-section.

9. An occupant restraint activation sensor as defined in claim 5, wherein said light pipes are of rectilinear cross-section.

10. An occupant restraint activation sensor for an automotive vehicle having a body, the sensor comprising:

a light source carried on said vehicle;

a light transmission module extending laterally across a frontal area of said vehicle in optical communication with said light source;

a photo responsive detector in communication with said light transmission module;

signal transmission means operative to activate the vehicle occupant restraint only when optical communication between said source and said photo responsive detector is severed in response to imposition of an impact load of predetermined magnitude on said vehicle; and wherein a signal return module is positioned on the other side of said vehicle body, said signal return module including reversing means operative to reverse optical communication laterally across said vehicle body.

* * * * *